(12) United States Patent
Wakabayashi et al.

(10) Patent No.: US 6,338,533 B1
(45) Date of Patent: Jan. 15, 2002

(54) BRAKE ASSEMBLY FOR A MOTORCYCLE

(75) Inventors: Takeshi Wakabayashi; Kazuhiko Tani, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/418,578

(22) Filed: Oct. 15, 1999

(30) Foreign Application Priority Data

Oct. 15, 1998 (JP) ............................................. 10-293394

(51) Int. Cl.[7] .............................. B62L 3/00; B62L 3/08; B60T 13/00; B60T 11/00; B60T 8/26
(52) U.S. Cl. ...................... 303/9.64; 188/344; 188/349; 188/10 GP; 303/9.71; 303/9.61; 303/DIG. 3; 303/137
(58) Field of Search ................................. 303/9.64, 137, 303/9.62, 9.61, DIG. 3, DIG. 4, 166, 113.5, 186, 6.81, 187, 188, 113.4, 9.75, 9.71, 9.72; 188/344, 349, 106 P

(56) References Cited

U.S. PATENT DOCUMENTS 5,372,408 A * 12/1994 Tsuchida et al. ............ 303/9.65
5,620,237 A * 4/1997 Iwashita et al. ............ 303/9.64
6,070,949 A * 6/2000 Hariu et al. ................ 303/9.64

FOREIGN PATENT DOCUMENTS

JP         7196068        8/1995

* cited by examiner

Primary Examiner—Douglas C. Butler

(57) ABSTRACT

A brake assembly for a motorcycle provided with a hydraulically actuated front brake and rear brake for a front wheel and a rear wheel, respectively, including a first brake actuating device and a second brake actuating device, for applying hydraulically pressure to the front and rear brakes; and an electronically controlled braking system, having a first hydraulic system extending from the first brake actuating device connected to the front brake, and a second hydraulic system extending from the second brake actuating device, connected to the rear brake, with an electronic control device receiving detection values for each of the first actuation amount detection device for detecting an actuation amount of the first brake actuating device, and a second actuation amount detection device for detecting an actuation amount of the second brake actuating device, subjecting them to computation, and outputting control signals to a hydraulically controlled actuator based on the result of the computation, and actuating the front brake or the rear brake using the hydraulically controlled actuator in accordance with the control signals.

9 Claims, 4 Drawing Sheets

BRAKE ASSEMBLY FOR A MOTORCYCLE

BACKGROUND OF THE INVENTION

1. Field of the Invention

The present invention relates to a motorcycle brake assembly provided with a hydraulically driven front wheel brake and rear wheel brake, for relational control of the two brakes.

2. Background Art

A motorcycle brake actuation is carried out using a brake lever provided on the handlebar and a brake pedal provided on a step. Braking force is distributed to the front wheel brake and rear wheel brake according, to actuation of each of the actuating means.

In Japanese Patent Laid-open Publication No. Hei. 7-196068, for example, there is disclosed an example using partial electronic control. The brake system of this type is shown in FIG. 4.

A front wheel brake 02 and a rear wheel brake 05 are hydraulic brakes. A lever master cylinder 07 is provided on a brake lever actuating means, while a pedal master cylinder 012 is provided on a brake pedal 011.

A lever hydraulic system 08 extending from the lever master cylinder 07 is connected to the front wheel brake 02. A pedal hydraulic system 013 extending from the pedal master cylinder 012 is connected to one port of the three port type rear wheel brake 05. A hydraulic circuit 014 branching from the pedal hydraulic system 013 is connected to a secondary master cylinder 010, and the output of the secondary master cylinder 010 is connected to the other two ports of the rear wheel brake 05 through a control valve 016.

A brake switch 04, opened and closed by rotation of the other brake lever 06, is provided on the brake lever 06. A pressure sensor 041 for detecting hydraulic pressure is provided in the lever hydraulic system 08. A control unit 031 determines a hydraulic pressure to be generated at the secondary master cylinder 010 based on each of the detection signals from the brake switch 040 and the pressure sensor 041, and actuates an actuator 033 via a relay 032, so that the secondary master cylinder 010 generates the hydraulic pressure as required. These devices constitute an electronically controlled braking system.

When the brake pedal 011 is actuated independently, only the rear wheel brake 05 side is actuated disassociated from the front wheel.

When the brake lever 06 is actuated independently, or at the same time as the brake lever 011, the front wheel brake 02 is actuated by hydraulic pressure of the lever master cylinder 07, and the actuator 033 is actuated based on hydraulic pressure of the lever hydraulic system 08 to generate necessary hydraulic pressure in the secondary master cylinder 010 so that the rear wheel brake is actuated by the control valve 016.

The pedal hydraulic system 013 branches into two sections, with pipes leading to the rear wheel brake 05 and to the secondary master cylinder 010, and the control valve 016 is located between the secondary master cylinder 010 and the rear wheel brake 05. Therefore, the structure has many components and is complicated, and the operation of installing the piping and also maintenance can not be carried out easily.

The layout of the piping is also subject to restrictions, and there is little degree of freedom in the design.

Output from the electronically controlled actuator 33 interferes with the pedal hydraulic pressure of the secondary master cylinder, and is mechanically provided in a control valve 016 arranged downstream of the master cylinder 010, which means that the degree of freedom of electronic control is restrictive.

SUMMARY OF THE INVENTION

The present invention has been conceived in view of the above described problems. The object of the invention is to provide a brake assembly for a motorcycle that does not cause interference between hydraulic systems, allows free and independent electronic control, and which can reduce the number of components and the number of assembly steps.

In order to achieve the above described object, the present invention provides a brake assembly for a motorcycle provided with a hydraulically actuated front brake and rear brake for a front wheel and a rear wheel, respectively, including a first brake actuating means and second brake actuating means for supplying hydraulic pressure to the front and rear brakes; and an electronically controlled braking system, having a first hydraulic system extending from the first brake actuating means connected to the front brake, a second hydraulic system extending from the second brake actuating means connected to the rear brake, being input with detection values for each of a first actuation amount detection means for detecting actuation amount of the first brake actuating means and a second actuation amount detection means for detecting actuation amount of the second brake actuating means and subjecting them to computation, and outputting control signals to a hydraulically controlled actuator based on the result of computation, and actuating the front brake or the rear brake using the hydraulically controlled actuator.

If the first brake actuating means is actuated, the front wheel brake is actuated via the first hydraulic system and the actuating amount is detected by the first actuating amount detection means and output to the electronic control means. If the second brake actuating means is actuated, the rear wheel brake is actuated via the second hydraulic system, and the actuating amount is detected by the second actuating amount detecting means and output to the electronic control means.

The electronic control means carries out computation based on the inputted detected values of the actuating amount, outputs control signals to a hydraulic control actuator, and the front wheel brake and rear wheel brake are actuated in accordance with these control signals.

Piping for a hydraulic system without a control valve can be simplified and made short, the number of components can be reduced, and the piping and maintenance operations can be simplified.

The electronically controlled braking system is independent from the first and second hydraulic systems handling the hydraulic pressure, which means that no interference occurs between the two hydraulic pressures, and freedom with respect to electronic control is increased.

A second aspect of the present invention is a brake assembly of the first aspect in which the first brake actuating means is a lever master cylinder, the second brake actuating means is a pedal master cylinder, and the hydraulically controlled actuator actuates the rear brake.

The first hydraulic system is connected between the lever master cylinder and the front wheel brake, while the second hydraulic system is connected between the pedal master cylinder and the rear wheel brake. This means that the piping can be made short, and since actuation of the rear wheel brake is controlled by two systems, namely the second hydraulic system and the electronically controlled braking system, even if one of the systems fails, the brake can still be actuated the other system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
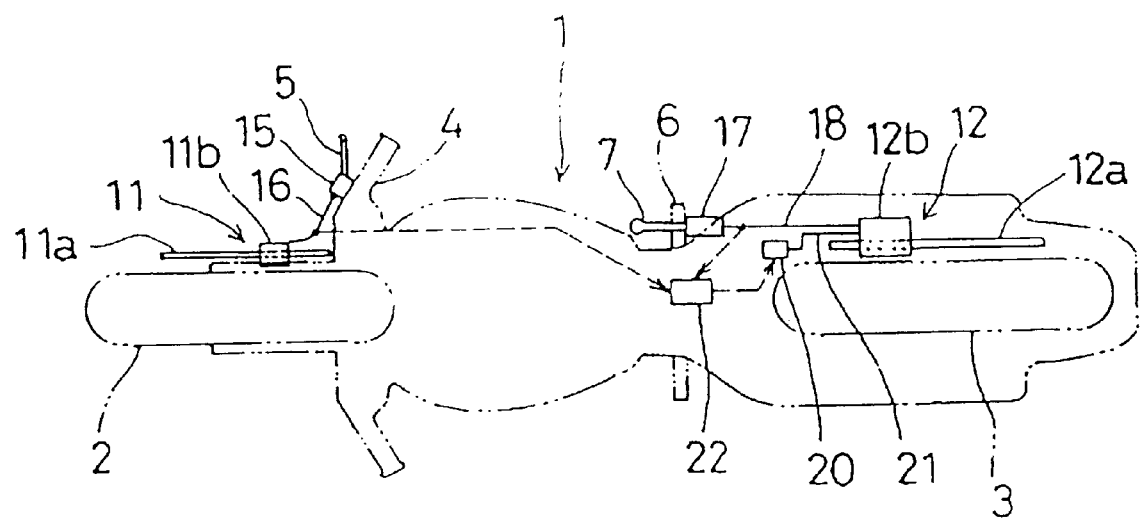
FIG. 1 is a schematic diagram showing a braking system for a motorcycle adopting the brake assembly of the first embodiment of the present invention.
Figure 2:
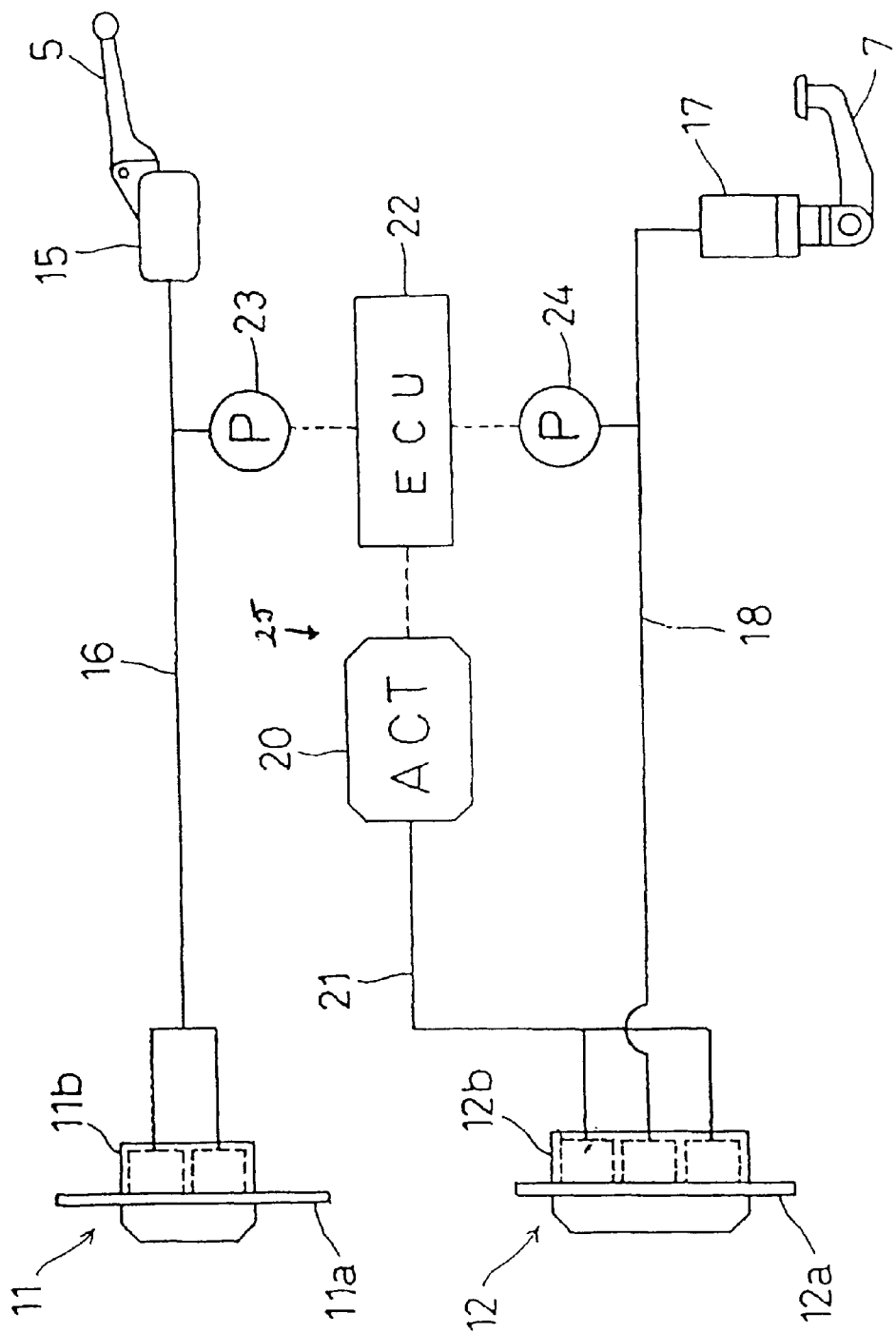
FIG. 2 is a structural diagram of the braking system in accordance with the first embodiment of the present invention.

An embodiment of the present invention will now be described in the following with reference to FIG. 1 and FIG. 2.

A motorcycle 1 is shown to illustrate the braking system of the present invention. However, the braking system of the present invention is not limited to motorcycles. The system is may be implemented on various other vehicles, including, for example, three-wheel and four-wheel motorized vehicles.

A hydraulic pressure type front wheel brake 11 is provided on a front wheel 2, and a hydraulic pressure type rear brake 12 is provided on a rear wheel 3. Both the front and rear brakes are disk brakes, comprising brake disks 11a and 12a, and brake calipers 11b and 12b.

A brake lever 5 is located on the right side handlebar, while a brake pedal 7 is located close to a right side step 6. The brake lever 5 is attached to a lever master cylinder 15, and the brake pedal 7 is attached to a pedal master cylinder 17.

Piping of a lever hydraulic system 16 extending from the lever master cylinder 15 is connected to the brake caliper 11b of the front wheel brake 11, and piping of a pedal hydraulic system extending from the pedal master cylinder 17 is connected to the brake caliper 12b of the rear wheel brake 12.

An electronically controlled actuator 20 is arranged close to the rear wheel brake 12. The electronically controlled actuator 20 and the rear wheel brake 12 are connected by piping 21 of the electronically controlled braking system 25.

The electronically controlled actuator 20 is controlled by an electronic control unit (ECU) 22. Respective hydraulic pressure detection signals of the lever hydraulic system 16 and the pedal hydraulic system 18 are input to the ECU 22.

The structure of the brake system described above is shown in FIG. 2.

A hydraulic pressure sensor 23 is provided in the lever hydraulic system 16. The hydraulic pressure sensor 23 detects an actuation pressure, being an actuating amount, generated in the lever master cylinder 15 by actuation of the brake lever 5 and outputs a detection signal to the ECU 22.

Similarly, a hydraulic pressure sensor 24 provided in the pedal hydraulic system 18 detects an actuation pressure generated in the pedal master cylinder 17 by actuation of the brake pedal 7, and outputs a detection signal to the ECU 22.

The caliper 11b of the front wheel brake 11 is a two port type with two pistons. The lever hydraulic system 16 is connected to both ports of the caliper 11b. On the other hand, the rear wheel brake 12 is a three port type, with one port being connected to the pedal hydraulic system and the other two ports being connected to the electronically controlled braking system 25.

If the brake pedal 7 is independently actuated, hydraulic pressure is provided to one port of the brake caliper 12b of the rear wheel brake 12 via the pedal hydraulic system 18, the pressure sensor 24 detects the pedal actuating pressure and outputs it to the ECU 22, the ECU then carries out computation based on this detection signal, outputs a control signal to the electronically controlled actuator 20, and provides hydraulic pressure to the other two ports of the brake caliper 12b using the electronically controlled actuator 20.

Thus, if the brake pedal 7 is independently actuated, hydraulic pressure is provided to one port of the rear wheel brake 12 by the pedal hydraulic system, while hydraulic pressure is provided to the other two ports under control of the electronically controlled braking system 25, and only the rear wheel 3 is braked.

If the brake lever 5 is independently actuated, hydraulic pressure is supplied to the front wheel brake 11 through the lever hydraulic system, the front wheel 2 is braked, and at the same time the pressure sensor 23 detects the lever actuating pressure and outputs it to the ECU 22. Hydraulic pressure is then supplied to the rear wheel brake 12 by the electronically controlled braking system 25 based on this detection signal. The rear wheel 3 is also controlled so as to be braked at an appropriate pressure and timing. Thus, braking force is thus applied in a suitably distributed manner to the front wheel 2 and the rear wheel 3.

If the brake lever 5 and the brake pedal 7 are actuated at the same time, hydraulic pressure is respectively supplied directly to the front wheel brake 11 and the rear wheel brake 12 through the lever hydraulic system 16 or the pedal hydraulic system 18 to brake both the front wheel 2 and the rear wheel 3, and at the same time the ECU 22 is input with lever actuation pressure and pedal actuation pressure detection signals and carries out computation. Based on the computation results, control signals are output to the electronically controlled actuator 20, the electronically controlled actuator 20 actuates the rear wheel brake 12, the rear wheel 3 is braked at an appropriate pressure and braking force is applied in a suitably distributed manner to both the front wheel 2 and the rear wheel 3.

The lever hydraulic system 16 is connected to lever master cylinder with the front wheel brake 11, while the pedal hydraulic system connects the pedal master cylinder 17 with the rear wheel brake 12. This means that the short piping can be used. The electronically controlled braking system 25 is also located close to the rear brake 12, therefore, piping for the hydraulic system is simplified, the number of components can be reduced, and piping and maintenance operations are made easier.

The electronically controlled braking system 25 is independent from the lever hydraulic system and the pedal hydraulic system handling only the hydraulic pressure, which means that no interference occurs between the two hydraulic pressures thereby allowing increased freedom with respect to electronic control.

Since actuation of the rear wheel brake 12 is controlled by two systems, namely the pedal hydraulic system 18 and the electronically controlled braking system 25, even if one of the systems fails, the brake can still be actuated by the other system.

In the above described embodiment, the electronically controlled braking system 25 functions with the rear wheel brake 12, but it can also function with the front wheel brake 11 instead of the rear wheel brake 12.

Figure 3:
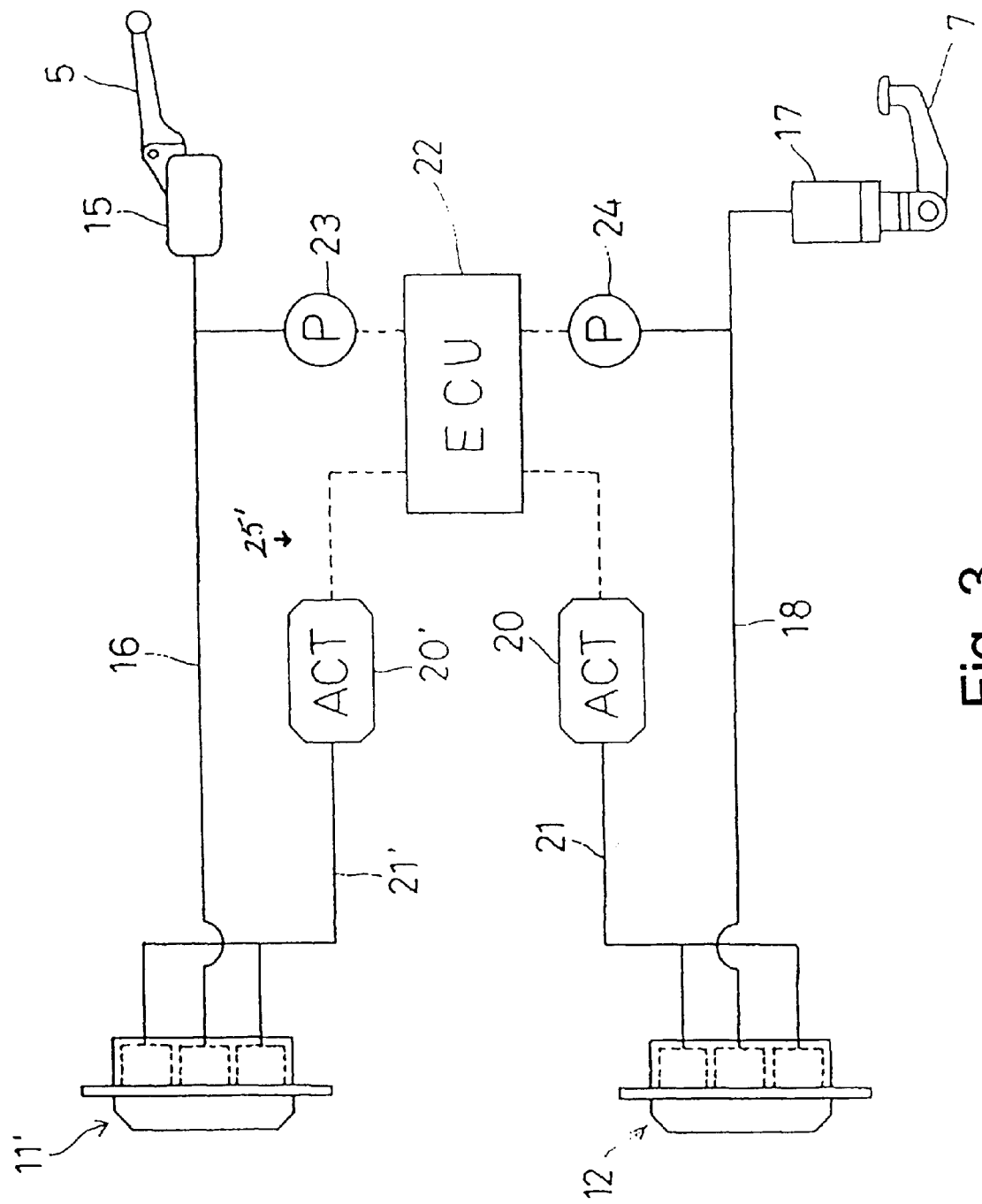
FIG. 3 is a structural diagram of a brake assembly according to the second embodiment of the present invention.
Figure 4:
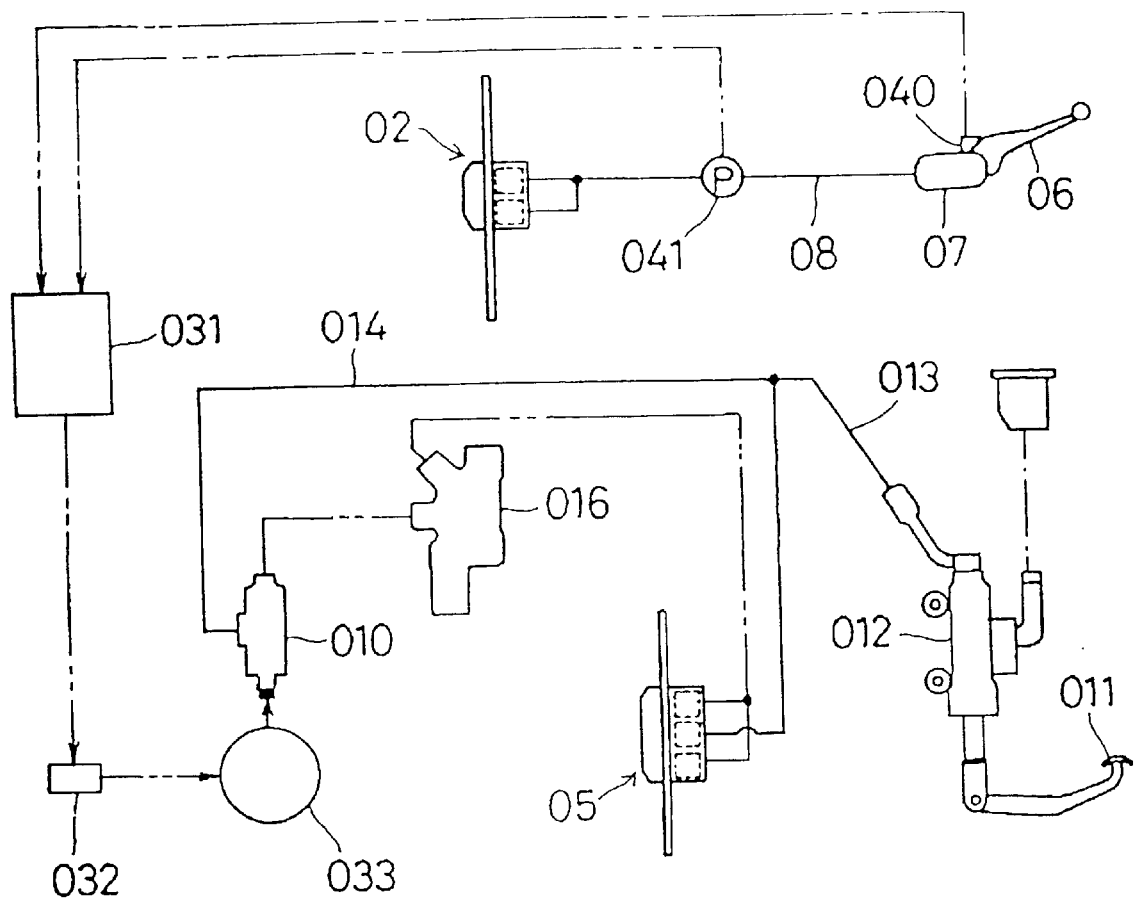
FIG. 4 is a structural diagram of a braking system of a conventional brake assembly.

As shown in FIG. 3, it is also possible for the front Wheel brake 11' to be a three port type, with an electronically controlled actuator 20' added and piping 21' extending from the electronically controlled actuator 20' is connected to 2 ports of the brake caliper of the front brake 11' with an electronically controlled braking system 25' similar to the electronically controlled braking of the rear brake 12 being provided for the front brake 11'.

With the above describe construction, the degree of freedom with respect to electronic control can be further increased in an assembly having a reduced number of interfering components.

Since the front wheel brake 11' is also actuated under the control of two systems, namely the lever hydraulic system and the electronically controlled braking system 25', even if one system fails the brake can be actuated by the other system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A brake assembly for a motorcycle provided with a hydraulically actuated front brake and rear brake for a front wheel and a rear wheel, respectively, comprising:
   a first brake actuating means and a second brake actuating means for applying hydraulic pressure to the front and rear brakes; and
   an electronically controlled braking system, having a first hydraulic system extending from the first brake actuating means connected to the front brake, and a second hydraulic system extending from the second brake actuating means connected to the rear brake, with an electronic control means receiving detection values from each of a first actuation amount detection means for detecting actuation amount of the first brake actuating means, and a second actuation amount detection means for detecting actuation amount of the second brake actuating means and subjecting the values to computation, outputting control signals to a electronically controlled actuator based on the result of computation, and actuating the front brake or the rear brake using the electronically controlled actuator in accordance with the control signals, and wherein the rear brake is operable via the electronically controlled actuator by way of actuation of the front brake actuating means only.

2. The brake assembly for a motorcycle as disclosed in claim 1, wherein the first brake actuating means is a lever master cylinder, the second brake actuating means is a pedal master cylinder.

3. A brake assembly, comprising:
   at least two brake actuating means for applying braking force;
   a first and second actuating means being operationally connected to each of said at least two brake actuating means, respectively, said first and second actuating means for providing signals representative of a desired braking level;
   a first sensor being operationally connected to said first actuating means, said first sensor receiving a signal generated by said first actuating means;
   a second sensor being operationally connected to said second actuation means, said second sensor receiving a signal generated by said second actuating means; and
   controller unit means being operationally connected to said first and second sensors, said controller unit at least partially controlling a braking force supplied to at least one of said at least two brake actuating means based upon a signal received from at least one of said first sensor and second sensor,
   wherein one of the said at least two brake actuating means is a first brake caliper having two ports and another of said at least two brake actuating means is a second brake caliper having three ports, and said first actuating means is connected to said two ports and said actuating means is connected to one said three ports.

4. The brake assembly of claim 3, wherein said controller unit means comprises:
   an electronic control unit being connected to each of said first and second sensors; and
   an electronically controlled actuator having an input side being connected to said electronic control unit and an output side being connected to one of said at least two brake actuating means.

5. The brake assembly of claim 3, wherein said controller unit means is connected to the other of said three ports.

6. The brake assembly of claim 5, wherein said controller unit means at least partially controls a braking force supplied to said second brake caliper based upon signals received from both said first and second actuating means.

7. A brake assembly, comprising:
   at least two brake actuating means for applying braking force;
   a first and second actuating means being operationally connected to each of said at least two brake actuating means, respectively, said first and second actuating means for providing signals representative of a desired braking level;
   a first sensor being operationally connected to said first actuating means, said first sensor receiving a signal generated by said first actuating means;
   a second sensor being operationally connected to said second actuation means, said second sensor receiving a signal generated by said second actuating means; and
   controller unit means being operationally connected to said first and second sensors, said controller unit at least partially controlling a braking force supplied to at least one of said at least two brake actuating means based upon a signal received from at least one of said first sensor and second sensor,
   wherein one of said at least two brake actuating means is a first brake caliper having a first three ports and another of said at least two brake actuating means is second brake caliper having a second three ports, wherein said first actuating means is connected to one of said first three ports and said second actuating means is connected to one of said second three ports.

8. The brake assembly of claim 7, wherein said controller unit means is connected to the other of said first three ports and further connect to the other of said second three ports.

9. The brake assembly of claim 7, wherein said controller unit means comprises:

an electronic control unit being connected to each of said first and second sensors; and a first and second electronically controlled actuator each having an input side being connected to said electronic control unit and each having an output side being connected to said at least two actuating means, respectively.

* * * * *